Nov. 4, 1947.   J. R. LYNCH   2,430,232
ILLUMINATED DISPLAY UTILIZING ULTRA-VIOLET AND VISIBLE LIGHT RAYS
Filed Aug. 30, 1943
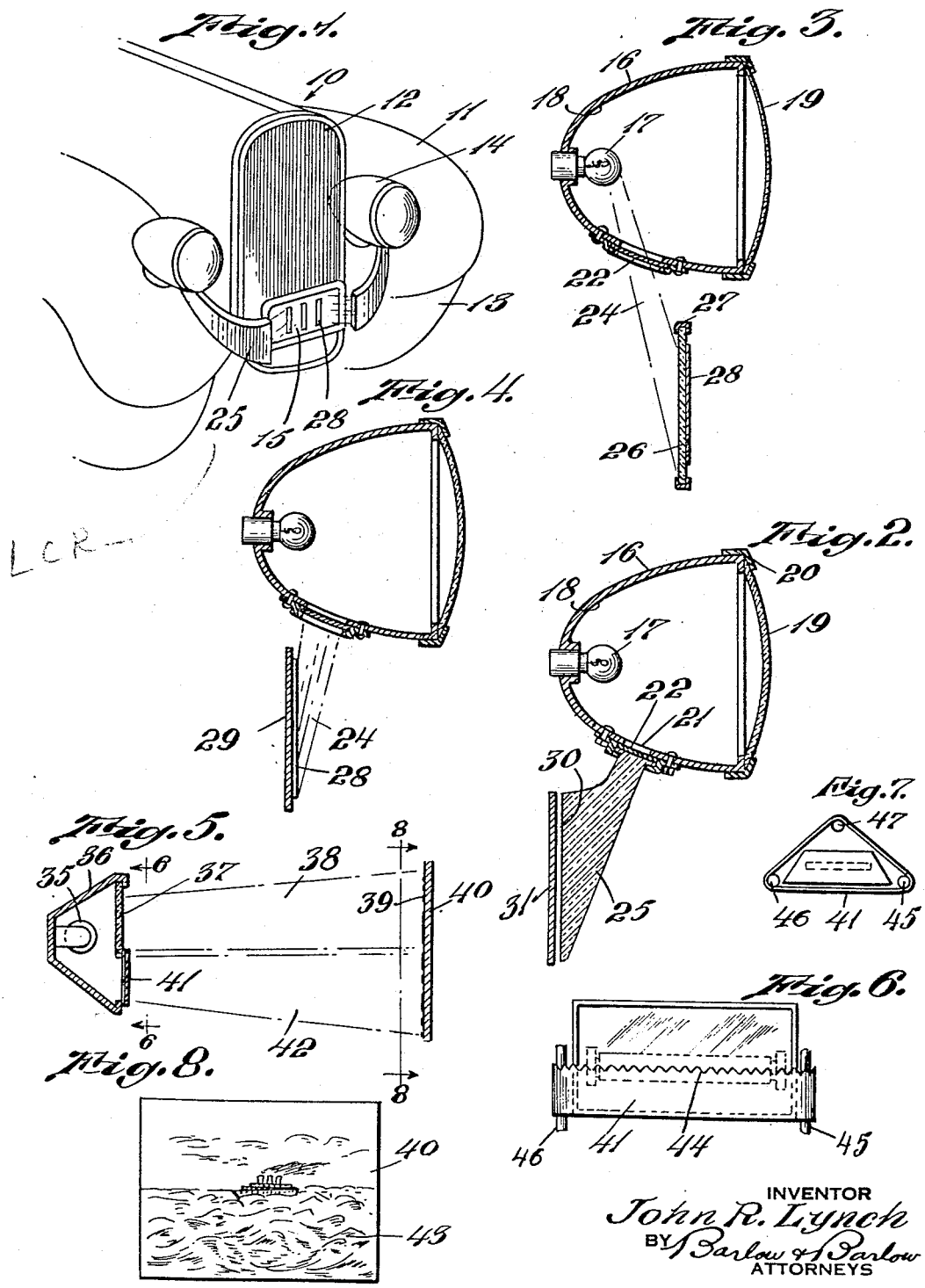
INVENTOR
John R. Lynch
BY Barlow & Barlow
ATTORNEYS Patented Nov. 4, 1947

2,430,232

UNITED STATES PATENT OFFICE 2,430,232

ILLUMINATED DISPLAY UTILIZING ULTRA-VIOLET AND VISIBLE LIGHT RAYS

John R. Lynch, Providence, R. I.

Application August 30, 1943, Serial No. 500,472

5 Claims. (Cl. 40—134.1)

This invention relates to illumination by utilizing ultra-violet rays which are produced at the time visible light is produced for providing different effects than heretofore have been produced by a single light source.

Most visible light that is used for illumination is produced from a light source which at the same time produces ultra-violet rays which are not visible to the eye. The visible light so produced is utilized for illumination of various objects at night or when the light from natural sources is insufficient. At times the ultra-violet light which is generated by a light source is utilized by screening the visible light and permitting the invisible ultra-violet rays to do useful work.

One of the objects of this invention is to use a single light source and cause the visible light to do one sort of useful illumination and cause the ultra-violet light to do another sort of illumination, thus using both forms of rays from a single source.

Another object of this invention is to use the visible light for one sort of illumination and the invisible light in connection with a fluorescent or photo luminescent material for producing a different sort of illumination.

Another object of this invention is to move the filter or control through which the invisible light is passed so as to cause the lighted surface to have the appearance of certain activation or motion.

Another object of this invention is to utilize the visible light for illumination of some fixed object while utilizing the ultra-violet light to activate some fluorescent material also a part of the object which may be given the effect of motion, that both fixed and moving parts of the object may be produced by the use of the two different kinds of light emanated from the same source.

With these and other objects in view, the invention consists of certain novel features of construction, as will be more fully described and particularly pointed out in the appended claims.

In the accompanying drawings:

Fig. 1 is a perspective view of the forward end of an automobile with lamps thereon equipped with the invention;

Fig. 2 is a sectional view through one of the lamps;

Fig. 3 is a view similar to Fig. 2 but illustrating a certain modified form of number plate illumination;

Fig. 4 is a view similar to Fig. 3 but illustrating a different arrangement of number plate illumination;

Fig. 5 is a sectional view illustrating a source of light equipped with an arrangement for controlling the different sorts of light in their emanation on to some obverse surface;

Fig. 6 is a front view of the light on line 6—6 of Fig. 5;

Fig. 7 is a diagrammatic view looking as in top plan on Fig. 5; and

Fig. 8 is the obverse surface illuminated as shown in Fig. 5 taken on substantially line 8—8 of Fig. 5.

It is known in the production of most visible light that a certain amount of ultra-violet rays are also produced. In the practical use of this invention I provide a source of light which will produce both visible light and ultra-violet light. The light is suitably encased within a shield which will have a lens to pass the visible light and a filter which will prevent the passage of visible light but will pass ultra-violet rays. The different rays may be differently directed or both may be directed onto the same sign or picture or obverse surface and further I activate or move the filter through which the ultra-violet rays pass and so shape the edge of the filter that the appearance of motion may be had along the edge of the obverse surface upon which the light is projected.

With reference to the drawings, 10 designates generally an automobile equipped with the usual mudguards 11, radiator grill work 12, tires 13, head lamps 14, and number plate 15.

Each of the head lamps is provided with a casing 16 having an incandescent light 17 therein from which emanate both visible rays and invisible ultra-violet rays. The casing is of some opaque material such as metal and provided with a reflecting surface 18. A suitable glass lens 19 is formed at the front end of the lamp and as shown in Fig. 2 is held in position by a rim 20 in a known manner. Visible light may pass through this lens 19 in a usual manner for the lighting of the road or any object which may be in the path of rays which pass through this lens. In the wall of the casing 16 an opening 21 is provided in which is set a filter 22 which will be of such character that it may pass invisible ultra-violet light but will not pass visible light. An example of such a filter is cobalt glass. This filter is so located in the casing that the ultra-violet rays will strike this filter and be projected therethrough without the casing. I may direct these ultra-violet rays such as are designated 24 by the dot-dash lines (see Figs. 3 and 4) so that they may be projected onto some photo luminescent or fluorescent material so as to cause that material to become visible. The rays may be directed either in a straight line such as indicated in Fig. 3 or Fig. 4 or the ultra-violet rays may be passed through some material designated 25 as in Figs. 1 and 2 so as to be conducted following its shape and be projected against the desired obverse surface.

In Fig. 3 I have illustrated a number plate 26 of transparent or transluscent material held in a frame 27 and which will have letters or characters 28 thereon coated with photo luminescent or fluorescent material so that when the ultraviolet rays 24 pass through this transparent plate 26 and strikes these characters, these characters will become luminous and visible. In Fig. 4 this number plate 29 is opaque, all the characters 28 are on the front and the light 24 is projected from the front to strike the photo luminescent or fluorescent coated characters and make them luminous. In Fig. 2 the Lucite material for directing the light other than in straight lines causes the light to be emanated from the end of this material designated 30 onto the number plate deignated 31 or 15 in Fig. 1 the characters on which are coated with photo luminescent or fluorescent material so as to cause the same to become visible. As shown in full lines in Fig. 2 this number plate is back of the entrance of the rays into the conducting material 26. As shown in Fig. 1 the ultra-violet light is conducted to either side of the number plate while permitting its face to be visible from the front.

In Fig. 5 I have illustrated a light source 35 with its enveloping casing 36. The lens is divided into two parts the upper part 37 being capable of passing visible light as shown by the area 38 onto the obverse surface 39 of a picture or the like 40, (see also Fig. 8) while the lower front open portion of the casing is equipped with a filter 41 capable of passing ultra-violet rays but incapable of passing visible light. The ultraviolet rays will thus be projected in the area 42 as inaicated by dotted lines toward the surface 39 of the picture 40. The water portion 43 of the picture 40 will be so treated that it will be responsive to the ultra-violet rays and will be visible as the result of such ultra-violet rays striking it, while the upper part of the picture designating the sky and the boat will be fixed and will not be treated with any material which will respond to the ultra-violet rays. The filter 41 is serrated at its upper edge as at 44 and is in the form of a strip or film of plastic material having properties allowing the filtering through of ultra-violet rays which may be moved across the light source and by reason of this undulating or serrated form of the filter, which edge passes over the part of the picture which illustrates the horizon or top of the waves, motion will appear on the band portion of the surface of the water which will be exposed to the visible light by the depth of the undulations 44, the height of which cause the ultra-violet ray activation. This film 41 will be moved over suitable rotatable guides 45 and 46 at either side of the forward edge of the light source and also about a driven pulley 47 rearwardly of the light source which may be actuated by a suitable electric motor. The movement given the film will be slow or in such timed relation as is necessary to give the proper motion to the water which appears in the picture.

It will be readily apparent that other activation by reason of the movement of the film or filter which transmits only the ultra-violet light may be had so that other moving effects may be provided.

I claim:

1. In combination a light source producing visible light and invisible ultra-violet rays, means for controlling the direction of projection of the light source comprising a casing about said light source with a portion transparent to pass the visible light toward a desired direction, a filter to screen the visible light and pass the ultra-violet rays in a different direction and an obverse body provided with fluorescent material in the path of said ultra-violet rays to be activated thereby, whereby the ultra-violet rays are invisible to the eye and yet the object is made visible.

2. In combination an observe surface having a pictured area thereon with a portion thereof having elements of nature usually in motion which motion area is provided with luminescent material, a light source producing visible light and invisible ultra-violet rays, means for controlling the direction of projection of the light source comprising a casing about said light source with a portion transparent to pass the visible light toward a portion of said surface, a filter to screen the visible light and pass the ultra-violet rays in a different direction and toward the luminescent area of said surface, said filter being provided with a wavy edge and means to move said filter in front of said light source to give to said pictured area the appearance of motion.

3. In combination a light source producing visible light and unvisible ultra-violet rays, means for controlling the direction of projection of the light source comprising a casing about said light source with a portion transparent to pass the visible light toward a desired direction, a filter to screen the visible light and pass the ultra-violet rays in a different direction but closely adjacent said visible light and an obverse body provided with fluorescent material in the path of said ultraviolet rays to be activated thereby and to also be lighted by said visible light, whereby the ultraviolet rays are invisible to the eye and yet the object is made visible.

4. In combination a light source producing visible light and invisible ultra-violet rays, means for controlling the direction of projection of the light source comprising a casing about said light source with a portion transparent to pass the visible light toward a desired direction, a filter to screen the visible light and pass the ultra-violet rays in a different direction but closely adjacent said visible light, an obverse body having pictured thereon over a portion thereof elements of nature usually in motion which elements are provided with fluorescent material and located in the path of said ultra-violet rays to be activated thereby and said obverse body also being lighted by a portion of said visible light, said filter being provided with a wavy edge, and means for moving said filter in front of said light source to give to said pictured area the appearance of motion.

5. In combination a light source producing visible light and invisible ultra-violet rays, means for controlling the direction of projection of the light source comprising a casing about said light source with a portion transparent to pass the visible light toward a desired direction, a filter to screen the visible light and pass the ultra-violet rays in a different direction but closely adjacent said visible light, said filter being provided with a wavy edge, means to move said filter in front of said light source and an obverse body having pictured thereon over a portion thereof elements of nature usually in motion which elements are provided with fluorescent material in the path of the visible and invisible rays to reflect said visible light in one portion and to be visible on the fluorescent portion by the invisible ultra-violet rays projected thereon to give to said pictured area the appearance of motion.

JOHN R. LYNCH.

REFERENCES CITED

The following references are of record in the file of this patent:

UNITED STATES PATENTS

| Number | Name | Date |
|---|---|---|
| 2,324,384 | Grimes | July 13, 1943 |
| 2,247,409 | Roper | July 1, 1941 |
| 1,462,065 | Lee | July 17, 1923 |
| 1,544,782 | Stimson | July 7, 1925 |
| 1,888,861 | Laxer | Nov. 22, 1932 |
| 2,293,106 | Bourdanoff | Aug. 18, 1942 |
| 2,102,474 | McKenner et al. | Dec. 14, 1937 |
| 1,513,300 | Vose | Oct. 28, 1924 |
| 1,567,193 | Ritz-Woller | Dec. 29, 1925 |
| 2,279,596 | Schipper | Apr. 14, 1942 |
| 1,004,503 | Troy | Sept. 26, 1911 |